United States Patent
Fricker et al.

(10) Patent No.: US 12,132,744 B2
(45) Date of Patent: Oct. 29, 2024

(54) METHOD FOR PROCESSING WEB REQUESTS

(71) Applicant: NETACEA LIMITED, Manchester (GB)

(72) Inventors: David Fricker, Manchester (GB); Matthew Jackson, Manchester (GB); John Modin, Manchester (GB); Matthew Wedge-Roberts, Manchester (GB); Georgios Soteriou, Manchester (GB)

(73) Assignee: NETACEA LIMITED, Manchester (GB)

( * ) Notice: Subject to any disclaimer, the term of this patent is extended or adjusted under 35 U.S.C. 154(b) by 305 days.

(21) Appl. No.: 17/572,738

(22) Filed: Jan. 11, 2022

(65) Prior Publication Data

US 2022/0222302 A1 Jul. 14, 2022

(30) Foreign Application Priority Data

Jan. 12, 2021 (GB) ..................................... 2100372

(51) Int. Cl.
 *H04L 9/40* (2022.01)
(52) U.S. Cl.
 CPC ................ *H04L 63/1408* (2013.01)
(58) Field of Classification Search
 CPC ................................................ H04L 63/1408
 See application file for complete search history.

(56) References Cited

U.S. PATENT DOCUMENTS

| | | |
|---|---|---|
| 2011/0179017 A1 | 7/2011 | Meyers et al. |
| 2016/0191551 A1* | 6/2016 | Beauchesne ........ H04L 63/1425 726/23 |
| 2020/0076825 A1 | 3/2020 | Vallur |

FOREIGN PATENT DOCUMENTS

WO 2019063389 A1 4/2019

OTHER PUBLICATIONS

UKIPO, Search Report for corresponding United Kingdom Patent Application No. GB2100372.8, dated Oct. 1, 2021, 2 pages.

(Continued)

*Primary Examiner* — Brandon Hoffman
(74) *Attorney, Agent, or Firm* — NK Patent Law

(57) ABSTRACT

A method of processing web requests directed to a website includes, at a system for processing web requests: (i) for each of a plurality of web requests directed to a website, determining a request vector corresponding to the web request, wherein each request vector represents multiple predetermined features of the respective web request; (ii) clustering the request vectors by respectively assigning each request vector to one of a plurality of clusters using a clustering algorithm; (iii) repeatedly updating the clustering of request vectors using the clustering algorithm such that the plurality of clusters dynamically change over time; (iv) monitoring cluster metadata associated with each cluster as the plurality of clusters dynamically change over time, (v) identifying, based on monitoring, any cluster meeting a predetermined anomaly criterion indicating that the cluster is displaying anomalous behaviour; and (vi) triggering an investigation of a cluster identified as meeting the predetermined anomaly criterion.

12 Claims, 4 Drawing Sheets

(56) References Cited

OTHER PUBLICATIONS

Baruah, Rashmi Dutta et al.: "Dynamically Evolving Clustering for Data Streams", IEEE Conference on Evolving and Adaptive Intelligent Systems (EAIS), 2014, pp. 1-6.

Seger, Cedric: "An investigation of categorical variable encoding techniques in machine learning: binary versus one-hot and feature hashing", Kth Royal Institute of Technology School of Electrical Engineering and Computer Science (2018), 5 pages.

\* cited by examiner

METHOD FOR PROCESSING WEB REQUESTS

CROSS REFERENCE TO RELATED APPLICATION(S)

This application claims priority from United Kingdom Patent Application No. 2100372.8 filed on Jan. 12, 2021, the entire content and elements of which are herein incorporated by reference for all purposes.

FIELD OF THE INVENTION

The present invention relates to a method for processing web requests to a website.

BACKGROUND

Websites and other web-based systems are targets for abuse by automated processes and malicious visitors. These processes and visitors try to exploit weaknesses in the security and/or logic of web-based systems for commercial or other gain. Exploiting weaknesses in the web-based system can involve making a series of legitimate web requests of the system but in such a way, for example in an unexpected or unorthodox combination of web requests, that a result occurs which is unwanted by or undesirable for an administrator of the web-based system. For example, one such undesirable result is credential stuffing: an actor tries to gain access to user accounts through guessing the credentials. Such targeted attacks rely on a large volume of requests being made, often in an extremely distributed fashion making the identification of bad actors a particular challenge.

These types of activity cannot be stopped using traditional web-security products as such products are conventionally focused on identifying illegitimate web requests being made that exploit weaknesses in the underlying program code or platform code of the web-based system.

One possible approach for unwanted and undesirable requests discussed above is to implement software on devices which seek to identify a new visitor as an automated process and/or a malicious visitor. However, sophisticated attackers are now able to evade identification.

The present inventors have identified it would be desirable to provide a solution that can identify automated and/or malicious processes based on server-side activity, amongst other processes.

WO 2019/063389 discloses a method of processing web requests directed to a website. The present invention has been devised in light of the above considerations.

SUMMARY OF THE INVENTION

A first aspect of the invention may provide:
A method of processing web requests directed to a website, the method including, at a system for processing web requests:
(i) for each of a plurality of web requests directed to a website, determining a request vector corresponding to the web request, wherein each request vector represents multiple predetermined features of the respective web request;
(ii) clustering the request vectors by respectively assigning each request vector to one of a plurality of clusters using a clustering algorithm such that request vectors deemed to be similar to each other are assigned to a same cluster of the plurality clusters;
(iii) repeatedly updating the clustering of request vectors using the clustering algorithm such that the plurality of clusters dynamically change over time;
(iv) monitoring cluster metadata associated with each cluster as the plurality of clusters dynamically change over time, wherein the monitored cluster metadata associated with each cluster represents a current state of the cluster;
(v) identifying, based on the monitoring, any cluster meeting a predetermined anomaly criterion indicating that the cluster is displaying anomalous behaviour; and
(vi) triggering an investigation of a cluster identified as meeting the predetermined anomaly criterion.

The present inventors have found that by clustering web requests and repeatedly updating the clustering so that the clusters dynamically change over time (a process referred to herein as "dynamic clustering"), and by monitoring cluster metadata representative of the dynamically changing clusters, it is possible to more easily identify anomalous behaviour that might otherwise be very difficult to detect. By triggering an investigation of a cluster displaying anomalous behaviour, it is possible for a network administrator or automated process to determine whether the anomalous behaviour is a problem that needs dealing with (taking or prompting appropriate action where this is the case), or whether the anomalous behaviour is an acceptable change in behaviour that can be allowed to continue.

In particular, the system is able to adapt to different attack behaviours, which could range from a single user making a high volume of requests, to a high volume of users making very few requests from many different sources including from common internet service providers. Historically, it has been particularly difficult to identify problems caused by similar requests from many different sources. The system can also adapt to both short-term and long-term changes in web traffic (for example daily trends in website traffic, or increased traffic due to marketing), whilst still distinguishing anomalous behaviour.

Furthermore, trends in the behaviour of clusters (and thus the nature of the web requests therein) can be monitored and identified, potentially in near real time, which ensures prompt triggering of investigation if a cluster is identified as displaying anomalous behaviour.

As such, the method can be viewed as providing a tool that can help to identify anomalous behaviour in web requests that might otherwise be very difficult to detect.

Optional features will now be set out.

A cluster meeting the predetermined anomaly criterion may be a cluster suspected of being malicious, or having malicious intent. Accordingly, the method can ensure security of the website against entities with malicious intent.

In some examples, each web request may be pre-processed to provide the web request in a normalized form, preferably before determining a request vector corresponding to the web request. This may help simplify the processing of the web request.

Each request vector may be formed of an ordered sequence of indices capable of holding a value, wherein each index in the sequence corresponds to a respective dimension of an n-dimensional space. For each request vector, the sequence of indices forming the request vector may be representative of the multiple predetermined features of the respective web request. In a simple arrangement, each index in a request vector may correspond to a respective feature of a web request. As discussed below, the relationship between the sequence of indices of the request vector and the features of the web request represented by the sequence of indices may use one-hot vector encoding, and/or may use encoding of continuous features.

Some or all of the features represented by each request vector may be categorical features, i.e. taking on one of a limited number of possible values. Representing categorical features in each request vector may allow for efficient clustering and updating of the clustering of the request vectors.

One or more of the features represented by each request vector may be non-categorical features, such as continuous features, i.e. taking on one of an unlimited number of possible values. Preferably, the features of each web request represented by the respective request vector include at least the following:
- an identifier indicating web content sought by the web request (e.g. a request path indicating the web content sought);
- at least one identifier indicating the origin of the web request (e.g. in the form of an IP address indicating the origin of the web request; e.g. a data centre from which the request originated).

Having these features represented by each request vector is believed to reveal enough information to usefully identify anomalous behaviour.

One or more features which may additionally be represented by each request vector may include:
- an identifier indicating the time at which the web request was made (e.g. in the form of a time stamp, or time bucket);
- an identifier indicating a status of the web request (e.g. an indication of whether the web request was successful or unsuccessful);
- an identifier indicating one or more user agents, wherein a user agent may be a computer program (e.g. a web browser, a host operating system, a vendor, an application and/or a version of any of a web browser, a host operating system, a vendor and/or an application) associated with an entity or user; and
- an indication of the method of the (HTTP) request (e.g. an indication of a desired action to be performed by the web request at the website, such as GET for requesting retrieval of data, or POST for submitting data into a specified resource or form).

Preferably, each request vector is a sparse vector (e.g. a majority of the elements/indices in the vector are empty, unassigned and/or zero). Each request vector may have a binary format, e.g. formed by 1s, 0s, and optionally empty indices.

Each request vector may have a predefined dimension/size, e.g. corresponding to n-dimensions.

Optionally (for each of the plurality of web requests directed to the website), determining the request vector includes applying a hash function to the web request (preferably after normalization of the web requests). The hash function may implement feature hashing (also known as the hashing trick), e.g. by converting the predetermined (e.g. categorical) features of each web request into a request vector of a predefined size (e.g. n dimensions) by using hash values output by the hash function as indices of the request vector to be populated (e.g. assigning a value of 1 for these indices, and leaving other indices empty or setting them as '0'). In this way, the hash function constrains and standardizes the request vector dimensions so that it can later be used in a machine learning process. Feature hashing is a well-known technique.

Each request vector may include a plurality of feature vector portions, wherein each feature vector portion represents a single predetermined feature of the respective web request.

Thus, for each web request, determining a request vector may include determining a feature vector portion for each predetermined feature, and combining the feature vector portions into a single request vector. Combining the feature vector portions may include concatenating the feature vector portions together (e.g. end-to-end) to produce the single request vector.

Each feature vector portion may itself be sparse vector, for example a one-hot encoded vector. Each feature vector portion may have a predefined dimension/size, which may be greater than the number of possible specific inputs for each predetermined feature.

This helps to reduce the possibility of hashing collisions (i.e. when multiple hash values fall into a same vector index).

Cluster metadata associated with each cluster may include a cluster vector. The cluster vector may be formed of a sequence of indices capable of holding a value, wherein each index in the sequence corresponds to a respective dimension of an n-dimensional space. The cluster vector may be based (at least in part) on the request vectors represented by (e.g. contained within, or assigned to) the cluster. The cluster vector may optionally be configured to decay in time, e.g. as detailed below.

Cluster metadata associated with each cluster may include a cluster weight. The cluster weight may be based (at least in part) on a number of request vectors represented by the cluster. The cluster weight may optionally be configured to decay in time, e.g. as detailed below.

Each cluster may also be associated with a cluster size tag indicating a total number of request vectors assigned to the cluster.

Cluster metadata associated with each cluster may include a unique cluster identification tag.

Cluster metadata associated with each cluster may include a cluster age parameter which indicates or can be used to determine the age of the cluster. The cluster age parameter may be, for example, a cluster creation time (e.g. a cluster creation time stamp), from which the age of the cluster can be determined, and which could optionally be used as the unique cluster identification tag.

Cluster metadata associated with each cluster may include data representative of the request vectors assigned to the cluster, e.g. the number of request vectors represented by the cluster having the same predetermined features (e.g. the number of request vectors in the same cluster representing web requests with the same request path, and/or with same IP address), and/or the number of request vectors represented by the cluster having different predetermined features (e.g. the number of request vectors representing web requests with different paths and/or different same IP address, but in the same cluster).

Each request vector may be associated with request vector metadata.

After a request vector has been assigned to a cluster by the clustering algorithm, the request vector metadata may be updated to include a cluster identification tag indicating the cluster to which the request vector is assigned.

Clustering the request vectors into one or more clusters by respectively assigning each request vector to one of a plurality of clusters using a clustering algorithm may include, for each request vector, assigning the request vector to a cluster by:

calculating a similarity measurement representative of a degree of similarity between the request vector and the cluster vector associated with one or more, more preferably each, existing cluster (wherein the similarity measurement may be representative of a degree of similarity between the directions of the request vector and the cluster vector, or an angle therebetween, e.g. using a cosine similarity metric, and/or on a degree of similarity between the sizes of the request vector and the cluster vector, e.g. using a distance metric such as a Euclidean distance metric);

if the similarity measurement representative of the degree of similarity between the request vector and the cluster vector associated with any existing cluster meets a predetermined similarity criterion (e.g. indicating that the request vector is deemed similar to request vectors previously assigned to the cluster), assigning the request vector to one such existing cluster (preferably the cluster for which the similarity measurement indicated the highest degree of similarity between the request vector and the cluster vector);

if the similarity measurement representative of the degree of similarity between the request vector and the cluster vector associated with each existing cluster fails to meet the predetermined similarity criterion, assigning the request vector to a new cluster.

If a request vector is assigned to a cluster in accordance with this algorithm, the assigned request vector may be deemed to be similar to any request vectors previously assigned to the cluster.

Other algorithms for clustering the request vectors such that request vectors deemed to be similar to each other are assigned to a same cluster of the plurality of clusters may be envisioned by a skilled person, based on the teaching herein. For example, it would be possible to compare the request vectors and the individual vectors in each cluster, and assign the request vector to the cluster containing the most similar request vectors (without using a cluster vector).

Assigning a request vector to an existing cluster may include combining the request vector (e.g. by adding it to) the cluster vector representing the existing cluster, and/or updating the cluster weight of the existing cluster to account for the assigning of the request vector to the cluster, e.g. by adding 1 to the cluster weight.

Assigning a request vector to a new cluster may include using the request vector as the cluster vector, and setting the cluster weight of the new cluster to account for the assignment of the request vector to the new cluster, e.g. by setting the cluster weight to be 1.

Updating the clustering of request vectors using the clustering algorithm may include:
for each of a plurality of new web requests directed to the website, determining a request vector corresponding to the web request;
respectively assigning each new request vector to one of the plurality of clusters using the clustering algorithm such that request vectors deemed to be similar to each other are assigned to a same cluster of the plurality clusters.

The clustering algorithm may assign new request vectors to the plurality of clusters in batches. The clustering algorithm preferably assigns a new batch of request vectors to the plurality of clusters in the same way as described above.

It would also be possible for the clustering algorithm to assign new request vectors to the plurality of clusters individually, preferably in the same way as described above.

Each request vector may be associated with a web request timestamp indicating a time of arrival of the web request from which the request vector was determined.

Late or delayed request vectors may impact performance or usefulness of the clustering algorithm. Therefore, the clustering algorithm may be configured to assign each request vector to a cluster no more than X seconds after a time of arrival of the web request from which the request vector was determined (e.g. as indicated by a time stamp associated with that web request). X is preferably 600 or less, more preferably 60 or less, more preferably 15 or less. The clustering algorithm may be configured to disregard any request vectors arriving to be processed by the clustering algorithm more than X seconds after the time of arrival of the web request from which the request vector was determined.

Similarly, out of order request vectors may also impact performance or usefulness of the clustering algorithm. Therefore, the request vectors may be input into the clustering algorithm in chronological or close to chronological order as indicated by the arrival times of the request vectors for processing by the clustering algorithm. Alternatively, the request vectors may be input into the clustering algorithm in chronological or close to chronological order as indicated by the web request time stamps (which indicate a time of arrival of the web request from which the request vector was determined). This may be achieved, for example, by setting X to be a suitably low value.

Updating the clustering of request vectors may include performing a cluster merging check which includes:
for each of multiple pairs of clusters (preferable for each of all existing clusters), calculating a similarity measurement representative of a degree of similarity between the two clusters in the pair (wherein the similarity measurement may be representative of a degree of similarity between the directions of the two cluster vectors associated with the two clusters in the pair, or an angle therebetween, e.g. using a cosine similarity metric, and/or on a degree of similarity between the sizes of the two cluster vectors, e.g. using a distance metric such as a Euclidean distance metric); and
if the similarity measurement representative of the degree of similarity between a pair of clusters meets a predetermined similarity criterion (e.g. indicating that the two clusters in the pair are deemed to be similar), merging the pair of clusters.

The cluster merging check may occupy more computing resources than assigning a batch of new request vectors to the clusters. Accordingly, updating the clustering of request vectors may include assigning batches of new request vectors to the plurality of clusters more regularly than performing a cluster merging check. This may be characterised by a cluster merging rate parameter which reflects the number of merging checks performed for each batch of new request vectors assigned to the clusters. For precision, the cluster merging rate parameter would ideally be 1. However, due to computation restrictions, the cluster merging rate parameter is preferably less than 1, more preferably less than 0.5, more preferably less than 0.2. For example, the cluster merging rate parameter may be 0.1. Optionally, to preserve computational resources, each cluster may be merged no more than once per cluster merging check. The predetermined similarity criterion indicating that two clusters in the same pair are deemed to be similar may be configured to enforce this rule.

Merging a pair of clusters may comprise combining the two cluster vectors associated with the clusters in the pair (e.g. by summing the cluster vectors) to define a new cluster vector of the merged cluster, and combining the two cluster weights associated with the clusters in the pair (e.g. by summing the two cluster weights) to define a new cluster weight of the merged cluster. The original clusters may then be discarded as they are replaced by the merged cluster. The merged cluster may be assigned a cluster creation timestamp equal to the earliest cluster creation timestamp associated with the clusters in the pair. Similarly, the merged cluster may be assigned the cluster identification tag associated with the cluster in the pair having the earliest cluster creation timestamp.

Updating the clustering of request vectors may include culling one or more clusters deemed insignificant, in order to limit the number of clusters (which could become too computationally intensive, if this number grew too large).

For example, updating the clustering of request vectors may include, if the number of clusters exceeds a predetermined value, culling one or more clusters deemed insignificant in order to prevent the total number of clusters exceeding the predetermined value. The predetermined value may be less than 5000, and may for example be 1000.

The one or more clusters deemed insignificant may, for example, be the one or more clusters having the lowest cluster weight. Alternatively, the one or more clusters deemed insignificant may be one or more clusters having a cluster weight of less than a predetermined threshold. This predetermined threshold may be between 0 and 1, and may be controllable.

The one or more clusters deemed insignificant may, for example, be the one or more clusters having the lowest cluster weight among the clusters which have existed for more than a predetermined amount of time. This ensures that any clusters representing only older request vectors are removed as they are likely no longer of interest, which in turn ensures a real-time, up-to-date representation of the distribution of web requests, and also improves the computational efficiency of monitoring the clusters.

Other criteria for selecting the one or more clusters deemed insignificant may be envisaged by a skilled person in view of the disclosure herein.

Updating the clustering of request vectors may include updating the cluster metadata associated with each cluster to reflect a current state of the cluster.

Updating the cluster metadata to reflect a current state of the cluster may include applying a time decay algorithm to at least a portion of the cluster metadata, wherein the time decay algorithm causes the portion of the cluster metadata to decay with time.

In this way, the cluster metadata can better reflect a current state of the cluster, by giving more weight to more recent request vectors assigned to the cluster.

Updating the cluster metadata to reflect a current state of the cluster may include applying a time decay algorithm to each cluster weight, wherein the time decay algorithm causes a magnitude of the cluster vector to decay with time, e.g. according to a half-life, which may be in the range of 1 second to 10 hours, more preferably in the range of 5-10 seconds, for example (other decay modes are equally possible). In other words, the cluster weights may be a portion of the cluster metadata to which a time decay algorithm is applied.

Updating the cluster metadata to reflect a current state of the cluster may include applying a time decay algorithm to each cluster vector (e.g. each index in the cluster vector), wherein the time decay algorithm causes a magnitude of the cluster vector (e.g. the magnitude of the value of each index in the cluster vector) to decay with time, e.g. according to a half-life, which may be in the range of 1 second to 10 hours, more preferably in the range of 5-10 seconds, for example (other decay modes are equally possible). In other words, the cluster vectors may be a portion of the cluster metadata to which a time decay algorithm is applied.

For completeness, the cluster size tag indicating a total number of request vectors assigned to the cluster may not decay over time. In this way, the number of request vectors assigned to each cluster during the entire lifetime of the cluster is known. This may be used to provide important feedback, e.g. to an administrator of the website, in comparison to the weight of the cluster.

Updating the cluster metadata to reflect a current state of the cluster may include discarding the value of one or more indices of the cluster vector deemed insignificant, in order to maintain sparse cluster vectors. As discussed above, each cluster vector may be formed of a sequence of indices capable of holding a value, and the magnitude of the value of each index may decay with time. Discarding values of indices when the values are deemed insignificant provides a computationally efficient process, by removing values of indices tending towards zero due to cluster vector decay.

Discarding the value of one or more indices of the cluster vector when the value is deemed insignificant may include reducing the value of the one or more indices deemed insignificant to 0, and/or removing the value of the one or more indices deemed insignificant such that those indices are "empty". The value of the one or more indices may be deemed insignificant if the value is less than a predetermined threshold. This predetermined threshold may be between 0 and 1, and may be controllable.

The step of discarding the value of one or more indices of the cluster vectors deemed insignificant may be performed periodically, and/or upon any value of an index falling below the predetermined threshold.

Monitoring cluster metadata may involve monitoring one or more forms of cluster metadata as discussed herein. For avoidance of any doubt, monitoring cluster metadata need not involve monitoring all forms of cluster metadata discussed herein.

Preferably the monitored cluster metadata includes at least cluster weights and cluster vectors. Monitoring the cluster weights and cluster vectors allows monitoring of the number of request vectors and the content of the request vectors contained in a cluster.

Thus, the monitored cluster metadata may include the plurality of predetermined features of the web requests represented by the request vectors contained in the cluster (e.g. the number of specific or unique predetermined features of the web requests represented by the request vector contained in the cluster). For example, the monitored cluster metadata may include one or more of the following types of cluster metadata: the number of unique identifiers indicating web content sought (e.g. the number of unique request paths), the number of unique identifiers indicating the origin of the web request (e.g. the number of unique IP addresses), the number of unique identifiers indicating one or more user agents, the number of unique indications of the method of the request, and/or the number of identifiers indicating a successful web request. Of course, these are just examples, and other types of cluster metadata may be monitored instead of or in addition to those listed here.

Monitoring the cluster metadata may include aggregating some or all of the cluster metadata over tumbling time windows.

In some examples, the predetermined anomaly criterion may be set such that a cluster is identified as meeting the predetermined anomaly criterion based, at least in part, on the cluster weight. For example, the predetermined anomaly criterion may be set such that a cluster is identified as meeting the predetermined anomaly if the cluster weight associated with the cluster (or a rate of change of the cluster weight) exceeds a predetermined threshold. But this is just one example predetermined anomaly criterion, and others may be chosen depending on the anomalous behaviour intended to be identified.

Ultimately, the predetermined anomaly criterion (used to identify a cluster displaying anomalous behaviour) may be chosen differently, depending on the anomalous behaviour intended to be identified. For example, if the anomalous behaviour intended to be identified is credential stuffing, the predetermined anomaly criterion may be set such that a cluster is identified as meeting the predetermined anomaly criterion when the rate of change of the cluster weight associated with the cluster meets a predefined criterion, when a difference between the cluster age parameter or the cluster size tag associated with the cluster and the cluster weight, meets a predefined criterion (as this may indicate a cluster with a sudden increase in the number of web requests), and/or when the monitored cluster metadata indicates a high rate of website log-in requests (e.g. the rate of change of the number of identifiers indicating web requests seeking the same content, and/or the rate of change of the number of identifiers indicating an unsuccessful web request, meets a predefined criterion).

The predetermined anomaly criterion (e.g. the predetermined threshold discussed in the previous paragraph) may be determined (e.g. empirically) based on historical data. The predetermined anomaly criterion may be updated based on the outcome of the triggered investigation. This may help further improve the dynamic capability of the method.

Triggering the investigation of a cluster identified as meeting the predetermined anomaly criterion may include prompting a user to investigate the cluster, e.g. via a user interface displayed on a display device associated with the user. The user interface may be configured to allow the user to explore details of the web requests corresponding to the request vectors assigned to the cluster (i.e. the web requests from which the request vectors assigned to the cluster were determined).

Triggering the investigation of a cluster identified as meeting the predetermined anomaly criterion may include passing information describing the web requests corresponding to the request vectors (e.g. the request vectors and/or information describing the corresponding web requests) assigned to the cluster to a cluster investigation algorithm, for investigation by the cluster investigation algorithm.

The method may additionally include, preferably at the system for processing web requests, the cluster investigation algorithm performing the investigation of the identified cluster.

The cluster investigation algorithm performing the investigation of the identified cluster may assign the cluster to one of a plurality of classes, based on the investigation, wherein each class is intended to signify web requests having a particular intent.

The identified cluster may be assigned to one of the plurality of classes with an associated probability score. The identified cluster may be linked to each of the plurality of classes with a respective associated probability score, in which case the class to which the identified cluster is linked to with the highest probability score may be considered the as the one class to which the identified cluster is assigned.

Preferably, the plurality of classes include at least one class intended to signify web requests having a malicious intent.

There may be multiple classes intended to signify web requests having a malicious intent. Some or all of the multiple classes may be intended to signify web requests having the same malicious intent but with a different degree of certainty (e.g. "hot", "warm", "cold", "high", "low").

Some or all of the multiple classes may be intended to signify web requests having different malicious intents (e.g. "scraper", e.g. "credential stuffing").

Preferably, the plurality of classes include at least one class intended to signify web requests having a non-malicious intent.

The cluster investigation algorithm performing the investigation of the identified cluster may be configured to use a trained fuzzy inference algorithm, although it may alternatively/additionally be performed using other known algorithms. The trained fuzzy inference algorithm may use Mamdani fuzzy logic, for example. The trained fuzzy inference algorithm may be trained using automated and/or manual processes. Such a system has the advantage of being interpretable, and adjustable by a user.

One or more of the plurality of classes (optionally all of the plurality of classes) may be designated as requiring user attention.

If the cluster investigation algorithm performing the investigation of the identified cluster assigns the cluster to a class designated as requiring user attention, then the cluster investigation algorithm may be configured to alert a user to the cluster and the class to which the cluster has been assigned, e.g. via a user interface displayed on a display device associated with the user. The alert may optionally provide a recommendation for dealing with the cluster. In this way, the cluster and class to which the cluster has been assigned can be brought to the attention of the user so the user can make a determination of whether and to what extent action is required in relation to the cluster.

A second aspect of the invention may provide a computer system, configured to perform the method of the first aspect.

A third aspect of the invention may provide a computer-readable medium having computer-executable instructions configured to cause a computer system to perform a method according to the first aspect of the invention.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art.

Figure 1:
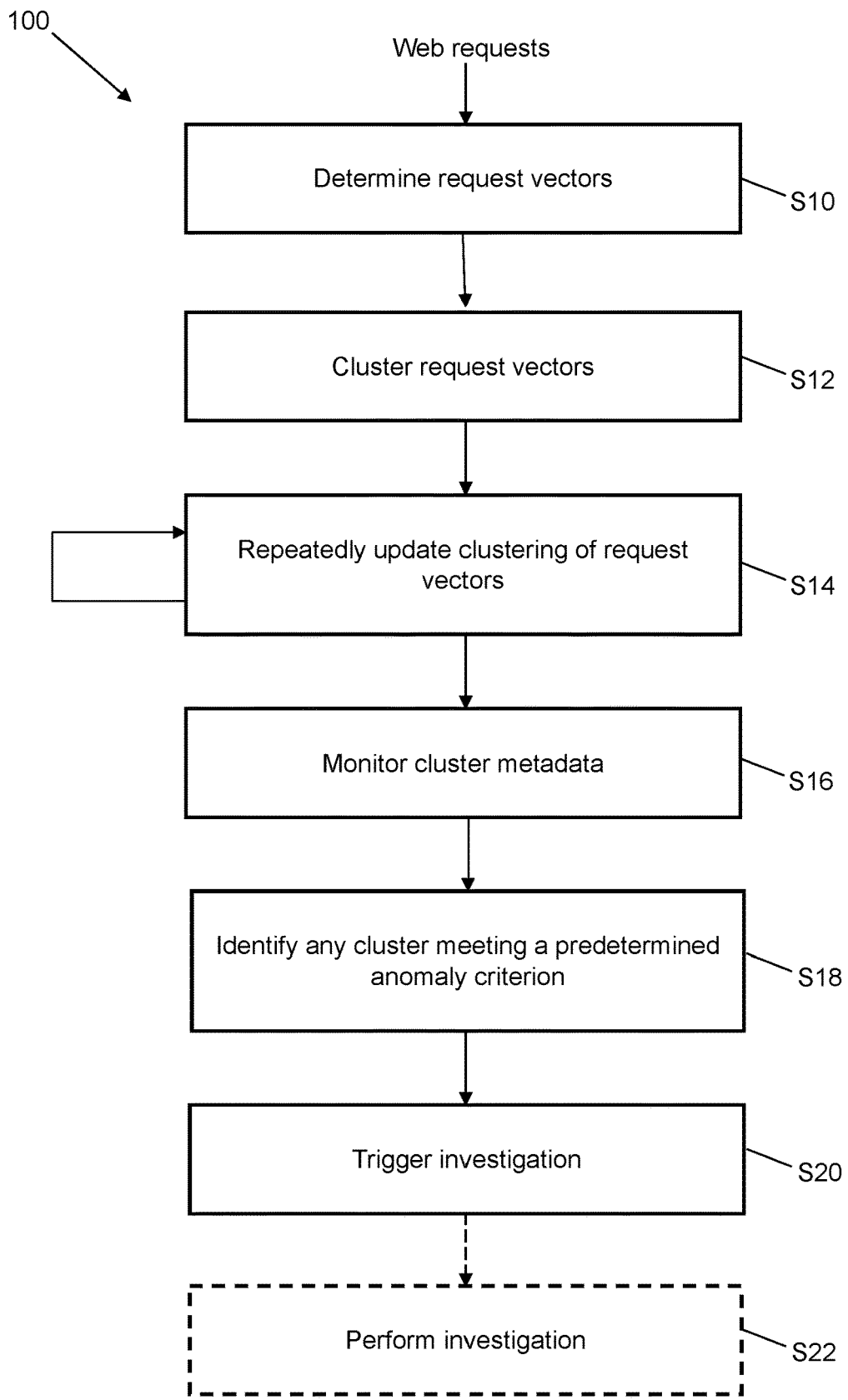
FIG. 1 is a flow chart showing a method for processing web requests in accordance with the invention.

FIG. 1 is a flow chart showing a method 100 for processing web requests directed to a website. Method 100 may be performed at a system illustrated in FIG. 2.

At S10 of FIG. 1, a request vector corresponding to the web request is determined for each of a plurality of web requests directed to the website. Each request vector represents multiple predetermined features of the respective web request. S10 is described in further detail below with reference to S110 of FIG. 2.

At S12, the request vectors are clustered by respectively assigning each request vector to one of a plurality of clusters using a clustering algorithm. In this way, request vectors deemed to be similar to each other are assigned to a same cluster. S12 is described in further detail below with reference to S112 of FIG. 2.

At S14, the clustering of request vectors is repeatedly updated using the clustering algorithm. In this way, the plurality of clusters dynamically change over time. This updating of the clustering is described in further detail below with reference to FIG. 2 and FIG. 3.

At S16, cluster metadata associated with each cluster is monitored as the plurality of clusters dynamically changes over time. Here, the monitored cluster metadata associated with each cluster represents a current state of the cluster. S16 is described in further detail below with reference to S116 of FIG. 2.

At S18, and based on the monitoring in S16, any cluster meeting a predetermined anomaly criterion indicating that the cluster is displaying anomalous behaviour is identified, based on the monitoring of cluster metadata in S106. Anomalous behaviour may be potentially malicious behaviour, for example. S18 is described in further detail below with reference to S120 of FIG. 2.

At S20, if a cluster is identified as meeting the predetermined anomaly criterion in S18, an investigation is triggered. S20 is described in further detail below with reference to S120 of FIG. 2. Triggering an investigation may include prompting a user to investigate the identified cluster (e.g. by providing an alert via a display screen) such that the user can proceed to investigate the identified cluster. Alternatively/additionally, triggering an investigation may include passing information describing the web requests corresponding to the request vectors in the identified cluster to an investigation algorithm for investigation.

Optionally, at S22, method 100 may include performing the investigation (e.g. by the investigation algorithm). S22 is described in further detail with reference to S122 of FIG. 2 and FIG. 4.

Figure 2:
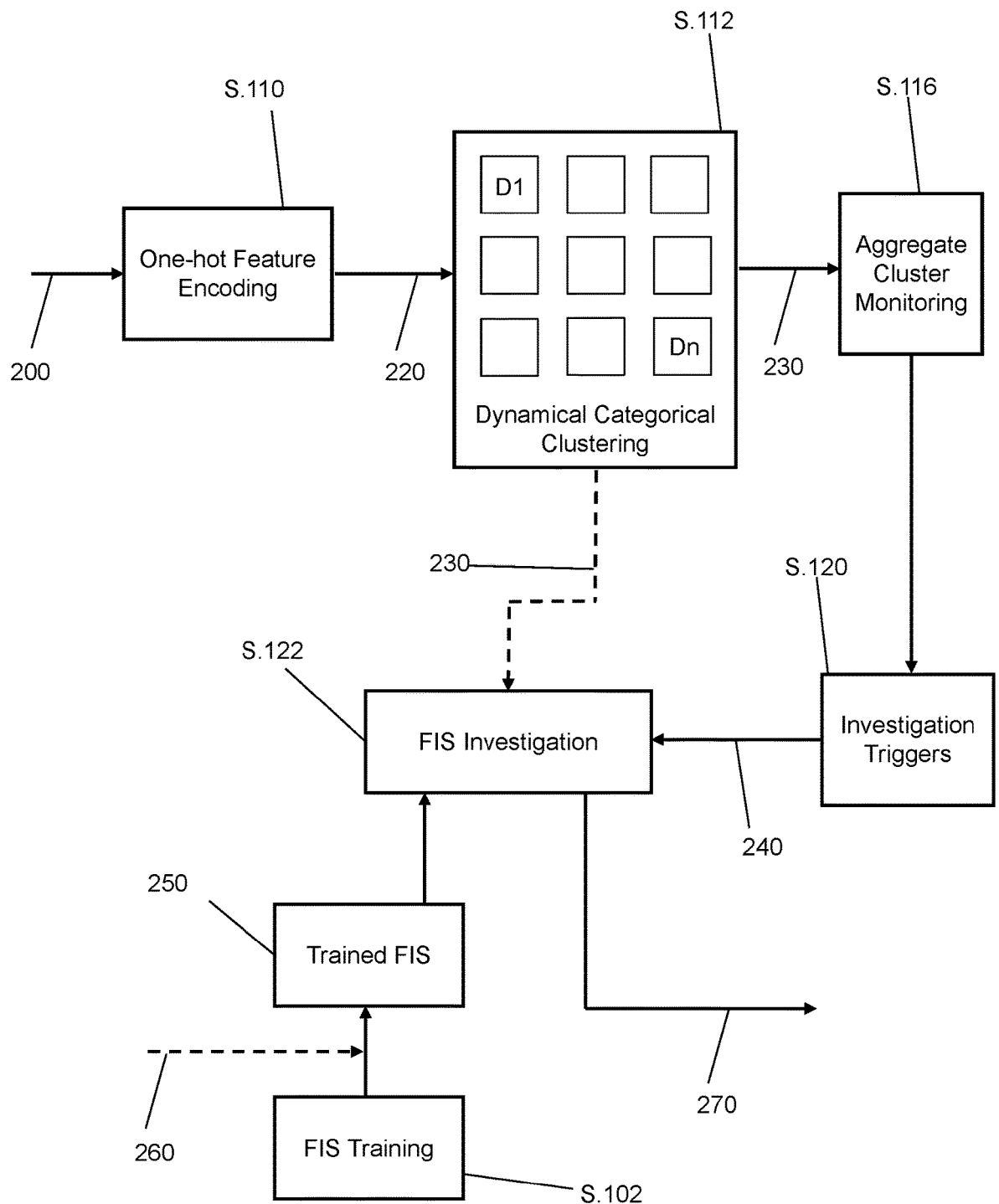
FIG. 2 shows a schematic system for processing web requests.

FIG. 2 shows a schematic system for performing the method of FIG. 1, and in particular, for processing web requests and identifying web requests suspected of being malicious or having malicious intent.

Web requests 200 directed to a website are input into the system in real-time. The web requests 200 are preferably pre-processed such that the web requests 200 are input into the system in a normalized form.

Then, at S110, a request vector is determined for each web request. Each request vector represents multiple predetermined features of the respective web request.

Specifically, a hash function is applied to each web request which implements feature hashing by converting the predetermined features of each web request into a request vector of a predefined size using hash values output by the hash function as indices of the request vector to be populated.

The predetermined features of each web request represented by the respective request vector may include an indication of one or more of: a request path indicating the web content sought, an IP address indicating the origin of the web request (e.g. a data centre from which the request originated), a time stamp or time bucket, an identifier indicating whether or not the web request was successful in receiving the web content sought, an identifier indicating a user agent, and/or a request method, for example.

In this example, each request vector includes a plurality of feature vector portions which are concatenated together (e.g. end-to-end) to form the single request vector representing the plurality of predefined features. Each feature vector portion represents a single predetermined feature of the respective web request. The feature vector portions are one-hot encoded sparse vectors, whereby the hashed value is assigned a value of 1 in an indexed position in the feature vector portion.

Each of the one-hot encoded sparse feature vector portions has a predefined number of dimensions, i.e. has a predefined number of indices capable of holding the value of 1.

The predefined number of indices in each feature vector portion is preferably approximately equal to (e.g. in the region of, +/−10% of) the number of possible specific inputs for each predetermined feature (e.g. for the predefined feature "request path", there may be X known possible request paths for a web request, and the predefined number of indices in the corresponding feature vector portion may be approximately equal to (e.g. in the region of, +/−10% of) X). This helps to reduce the possibility of hashing collisions. However, in some examples, the number of indices in each feature vector portion may be less than the number of possible specific inputs for each predetermined feature, but the possibility of hashing collisions increases as the number of indices in each feature vector portion becomes much smaller than the number of possible specific inputs for each predetermined feature. In some examples, the predefined number of indices in each feature vector portion may be greater than the number of possible specific inputs for each predetermined feature. Again, this helps to reduce the possibility of collisions. Furthermore, previously unknown possible specific inputs for a predetermined feature (e.g. previously unknown request paths) can be represented by the feature vector section and thus the resulting request vector.

The request vectors 220 are then input into a clustering algorithm at S112. The clustering algorithm clusters the request vectors 220 by assigning each request vector input into the clustering algorithm, to one of a plurality of clusters. Request vectors assigned to a same cluster are deemed to be similar to each other.

The request vectors 220 are preferably input into the clustering algorithm individually.

However, for performance reasons (e.g. to improve efficiency of the clustering), the request vectors 220 can also be input into the clustering algorithm in batches, e.g. in batches of up to 100 request vectors.

Late, delayed or out of order request vectors may impact performance of the clustering algorithm, and therefore it is preferable that the request vectors are input into the clustering algorithm in real-time (or close to real-time) and in chronological order (or close to chronological order). Thus, each request vector is associated with a web request timestamp indicating a time of arrival of the web request from which the request vector was determined. In order to ensure only close to real time request vectors are input into the clustering algorithm, the clustering algorithm assigns each request vector to a cluster no more than X seconds (e.g. 15 seconds) after a time of arrival of the web request, as indicated by the timestamp associated with that web request. Any request vectors arriving at the clustering algorithm more than X seconds (e.g. 15 seconds) after the time of arrival of the web request, as indicated by the timestamp, are disregarded and not input into the clustering algorithm. Setting X to a suitably low value (e.g. 15 seconds) also ensures that request vectors are input into the clustering algorithm in close to chronological order.

Each cluster of similar request vectors is associated with a cluster vector and a cluster weight. The cluster vector is based on the request vectors represented by the cluster, and the cluster weight is based on a number of request vectors represented by the cluster. However, both the cluster vector and the cluster weight decay in time, as described in further detail below, with reference to FIG. 3.

The process of assigning a request vector to a cluster in S112, performed by the clustering algorithm, includes calculating a similarity measurement (such as a cosine similarity metric or a Euclidean distance metric) between the request vector and a cluster vector associated with one or more existing clusters.

Then, if the similarity measurement between the request vector and an existing cluster meets a predetermined similarity threshold, it is determined that the request vector is deemed similar to request vectors previously assigned to that cluster, and the request vector is assigned to that existing cluster. To assign the request vector to the cluster, the request vector is added to the cluster vector representing the existing cluster, and 1 is added to the cluster weight.

However, if the similarity measurement between the request vector and any existing cluster fails to meet the predetermined similarity threshold, it is determined that the request vector is not sufficiently similar to request vectors in any existing cluster, and the request vector is assigned to a new cluster. To assign the request vector to the new cluster, the request vector is used as the cluster vector, and the cluster weight of the new cluster is set to equal 1.

After a request vector is assigned to either an existing cluster or a new cluster by the clustering algorithm, the request vector may be associated with a unique cluster identification tag indicating the cluster to which the request vector is assigned.

Information related to the request vector, such as information related to the web request represented by the request vector, may be output in association with the unique cluster identification tag. This information may be stored in memory in association with the cluster identification tag.

Each cluster is also associated with a cluster size tag indicating the total number of request vectors assigned to the cluster.

In S.112, the clustering algorithm repeatedly updates the clustering of request vectors such that the plurality of clusters dynamically changes over time. Therefore, the process described above for clustering request vectors is performed repeatedly with new incoming request vectors. Further method steps may also be performed in S.112 in order to update the clustering of request vectors, which are described in more detail in relation to FIG. 3.

At S.116, one or more types of cluster metadata associated with each of the plurality of clusters 230 is monitored by aggregating their content over tumbling windows, as the clusters dynamically change over time. The one or more types of cluster metadata that is monitored may include:
- a cluster vector associated with the cluster;
- a cluster weight associated with the cluster;
- a cluster size tag indicating a total number of request vectors assigned to the cluster;
- a cluster age parameter which indicates or can be used to determine the age of the cluster (e.g. a cluster creation time stamp);
- the number of request vectors represented by the cluster having the same predetermined features (e.g. number of request vectors in the same cluster representing web requests with the same request path, and/or the same IP address); and/or
- the number or request vectors represented by the cluster having different predetermined features (e.g. the number of request vectors representing web requests with different paths and/or different IP address, but in the same cluster).

Based on the monitoring at S116, any cluster meeting a predetermined anomaly criterion, in this example a predetermined malicious criterion indicating that a cluster is displaying potentially malicious behaviour, is identified at S120. An investigation of this identified potentially malicious cluster 240 is then triggered. The predetermined malicious criterion may be determined based on historical data, and may be updated based on the outcome of the triggered investigation (and one or more previous investigations).

Ultimately, the predetermined malicious criterion is chosen depending on the type of malicious behaviour intended to be identified. One example is that the predetermined malicious criterion is set such that a cluster is identified as displaying potentially malicious behaviour when the cluster weight associated with the cluster exceeds a predefined threshold. Another example, is that the predetermined malicious criterion is set such that a cluster is identified as displaying potentially malicious behaviour indicative of credential stuffing, when the rate of change of the cluster weight associated with the cluster, or a difference between the cluster age parameter or the cluster size tag associated with the cluster and the cluster weight, meets a predefined criterion.

In FIG. 2, triggering of an investigation launches the investigation at S122, in which a cluster investigation algorithm performs an investigation of the identified cluster 240.

The investigation may be launched at S122 automatically upon identification of a cluster displaying potentially malicious behaviour (e.g. by a dynamic trigger comparing rolling windows of the cluster metadata for change). Alternatively, an investigation into one or more clusters identified as displaying potentially malicious behaviour may be launched at S122 periodically, or upon a manual trigger.

In other examples, triggering of an investigation of the identified cluster may include prompting a user to investigate the cluster via a user interface displayed on a display device associated with the user, wherein the user interface may allow the user to explore details of the web requests corresponding to the request vectors assigned to the cluster.

Returning to FIG. 2, at S122, the cluster investigation algorithm performs an investigation of the identified cluster 240 using a trained fuzzy inference algorithm 250, which uses Mamdani fuzzy logic. As shown in FIG. 2, the trained fuzzy inference algorithm 250 is trained at S102 using automated processes, and optionally, adjusted by user input 260.

As shown in FIG. 2, the investigation at S122 includes collecting cluster metadata of the identified cluster 240. The collected cluster metadata may be time limited to within a predetermined previous time period (which may be e.g. within the last 30 minutes, the last 10 minutes, or the last 60 seconds). For example, request vectors assigned to the identified cluster and having an arrival time stamp indicating an arrival time of within the last 60 seconds may be included in the collected cluster metadata, but request vectors assigned to the identified cluster and having an arrival time stamp indicating an arrival time of before the last 60 seconds may be disregarded.

The type(s) of cluster metadata collected may be selected through training of the fuzzy inference algorithm 250 (at S102). The types of cluster metadata selected for collection may be the types and/or combination of types of cluster metadata that provide improved or even optimized discriminating power for the type of malicious behaviour intended to be identified. For example, the type of malicious behaviour intended to be identified may be credential stuffing, and the types of cluster metadata collected may include (within the predetermined previous time period): a number of request vectors represented by the cluster, the number of request vectors representing web requests which failed to obtain the web content sought by the web request, the number of request vectors representing web requests with different IP addresses and/or different data centres.

The trained fuzzy inference algorithm 250 may use fuzzy set theory to assign the identified cluster 240 to one of a plurality of classes, wherein each class is intended to signify web requests having a particular intent. In this example, one class is intended to signify web requests having a malicious intent indicative of credential stuffing, and another class is intended to signify web requests having a non-malicious intent.

The trained fuzzy inference algorithm 250 determines which class the identified cluster 240 should be assigned based on a set of fuzzy rules which are applied to the collected cluster metadata. The fuzzy rules are a collection of linguistic variables describing how cluster metadata map onto the one or more classes. Prior to applying the set of fuzzy rules, the collected cluster metadata is fuzzified, by processing the collected cluster metadata through one or more predetermined membership functions. The predetermined membership functions may be predetermined based on historical data, and in particular by fitting membership functions to historical data either manually, or using an automated system (e.g. using clustering techniques). The predetermined membership functions may have any shape, although they are usually S-shaped, Z-shaped, or have a sigmoid, trapezoidal or triangular shape.

Figure 4:
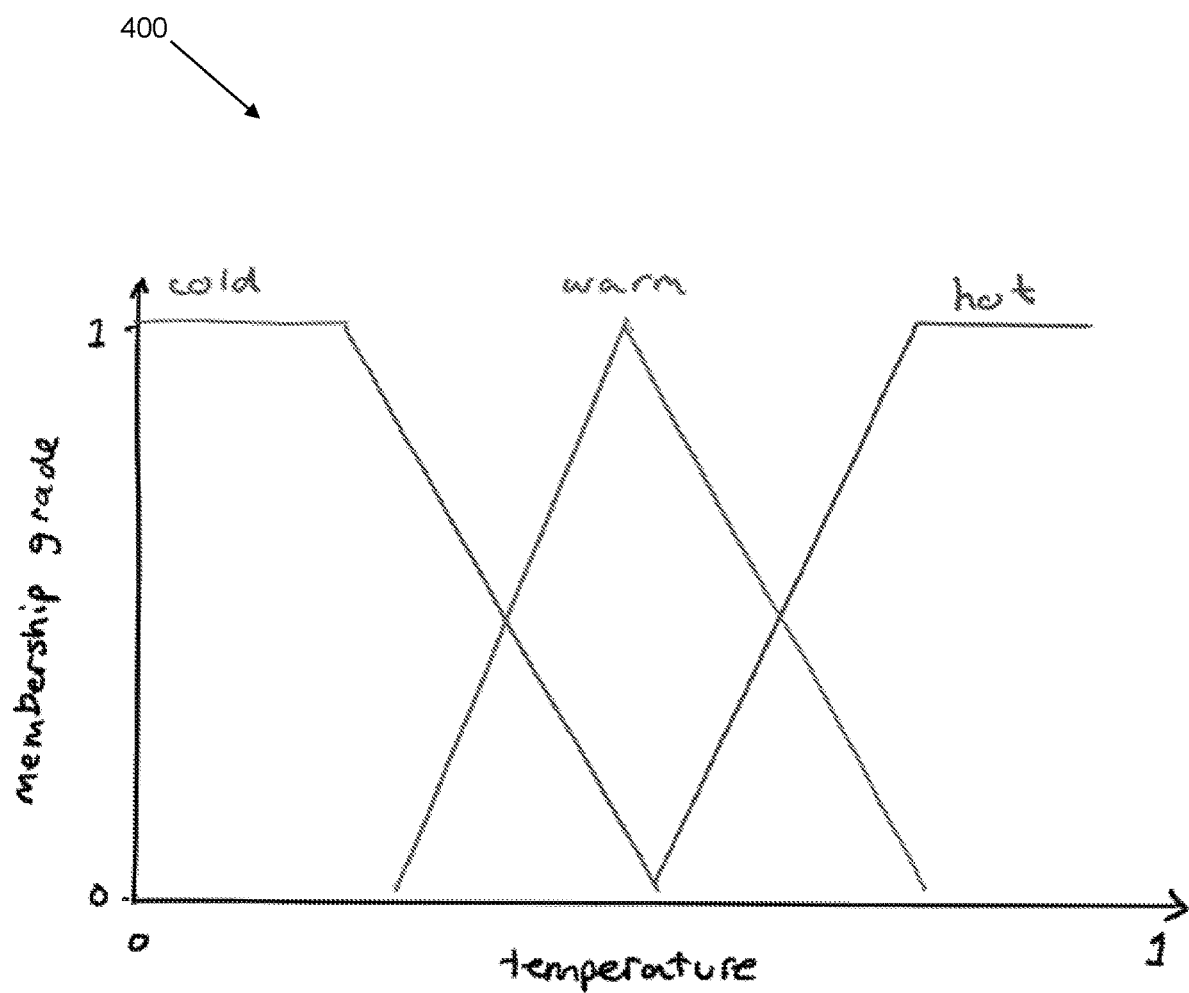
FIG. 4 is a plot illustrating how membership functions may describe a linguistic variable for use in performing an investigation by a trained fuzzy inference system.

FIG. 4 illustrates an example plot 400 of how membership functions may describe a linguistic variable. In this example, a temperature measurement is shown on the x-axis with possible values in the range of 0 and 1. The membership grade, shown on the y-axis, is bounded between 0 and 1 and describes the membership function at different temperatures. The membership functions are intuitively named cold, warm and hot. At a temperature of 0, the membership grade of cold is 1, warm 0 and hot 0, likewise at a temperature of 1 the membership grade of hot is 1, warm 0 and cold 0. In between, the grade of each membership function varies; as the temperature increases the cold membership grade decreases and the hot membership grade increases, and in between, the warm membership grade peaks in the middle of the temperature range. In practice, the membership functions are fit to describe historical data.

Returning to FIG. 2, the trained fuzzy inference algorithm 250 determines a probability score of the identified cluster being associated with one or more (and preferably each) of the classes, based on a result of the application of the fuzzy rules on the collected cluster metadata. The identified cluster is assigned to a class based on this probability score, and in particular, if a probability score exceeds a predetermined probability threshold for a specific class, the identified cluster is assigned to that specific class.

Thus, in an example, the identified cluster is assigned to a class intended to signify web requests having malicious intent indicative of credential stuffing, if the probability score associated with that class is greater than the probability threshold (which may be e.g. 50%).

If the result of the investigation (e.g. performed by the trained fuzzy inference algorithm 250) is that the identified cluster is assigned to a class intended to signify web requests having malicious intent (e.g. indicative of credential stuffing), an alert 270 is output. The alert 270 indicates information relating to the identified cluster 240 and the class to which it has been assigned by the investigation, e.g. that the web requests represented by the cluster are classified as having malicious intent indicative of credential stuffing.

The alert 270 may be provided via a user interface displayed on a display device associated with a user, and may provide a recommendation for dealing with the web requests in the cluster.

Figure 3:
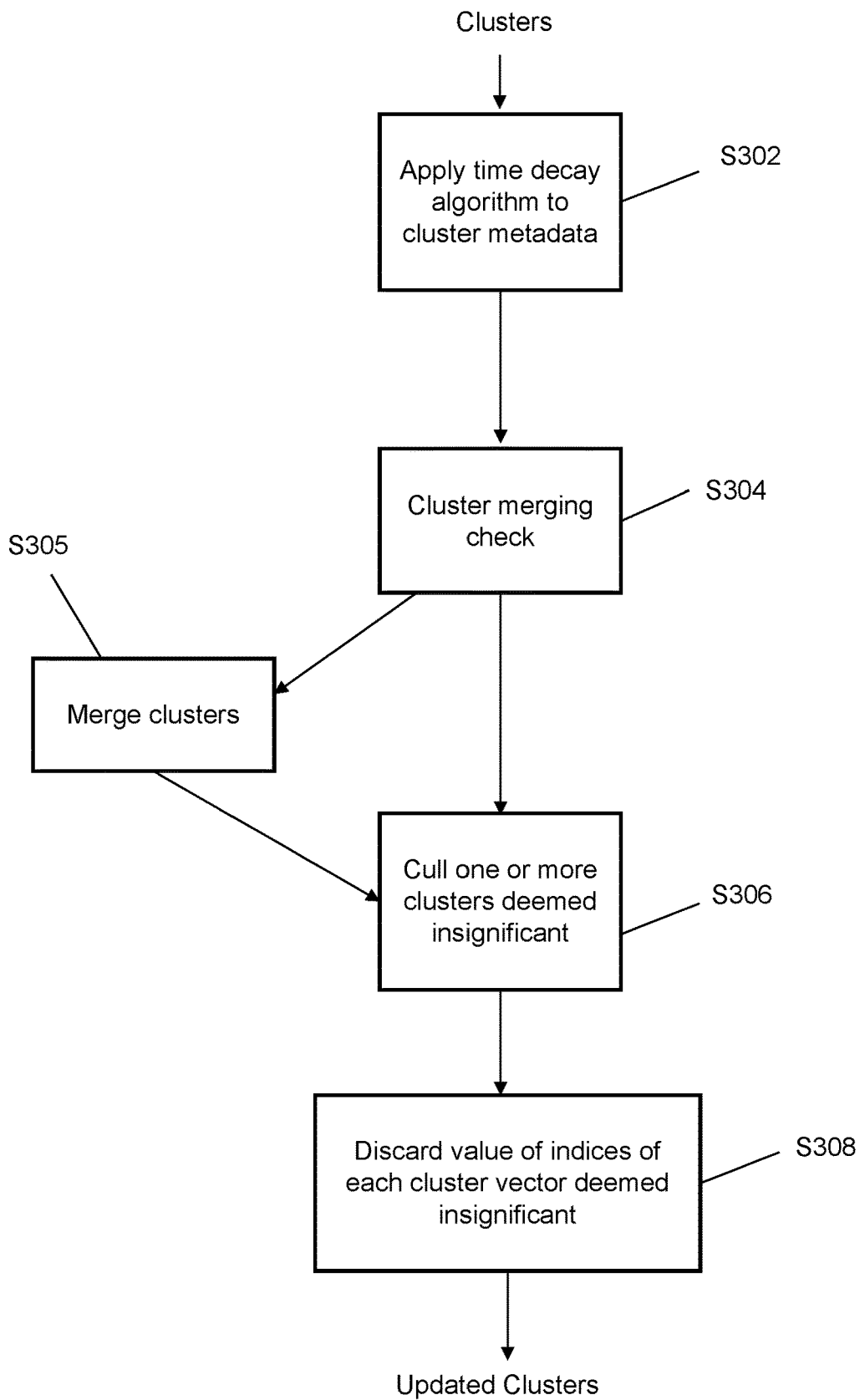
FIG. 3 is a flow chart showing method steps which may be performed in the step of updating the clustering of request vectors in the method of FIG. 1.

FIG. 3 is a flow chart showing method steps which may be performed in S14 of FIG. 1, which is the step of repeatedly updating the clustering of request vectors using the clustering algorithm, so that the plurality of clusters dynamically change over time.

Although not shown in FIG. 3, repeatedly updating the clustering of request vectors in S14 of FIG. 1 also includes repetition of S10 and S12 of FIG. 1 for new incoming web requests. Specifically, for each of a plurality of new web requests directed to the website, a request vector corresponding to the new web request is determined, and each new request vector is assigned to one of the plurality of clusters using the clustering algorithm.

Although FIG. 3 shows these method steps in a particular sequence, method steps S302-S306 shown in FIG. 3 may be performed in any order, or simultaneously, and may be performed in sequence or simultaneously with assigning new request vectors to clusters.

The purpose of these method steps is to ensure that cluster metadata of the clusters is up to date (i.e. so that the cluster metadata reflects a current state of the cluster).

At S302, a time decay algorithm is applied to both the cluster weight and the cluster vector associated with each cluster. The time decay algorithm causes the cluster weight and the magnitude of the cluster vector to decay with time. Preferably, the cluster weight and magnitude of the cluster vector decay according to a half-life of approximately 5-10 seconds.

However, the time decay algorithm is not applied to the cluster size tag indicating a total number of request vectors assigned to the cluster so that the cluster size tag associated with each cluster does not decay over time. The difference between the cluster size tag and the cluster weight is useful in determining if request vectors assigned to a cluster are old and out of date (e.g. a larger difference between cluster weight and cluster size tag indicates older request vectors assigned to the cluster). This information may be used later in S306 of FIG. 3, and/or during the investigation in S122 of FIG. 2.

At S304, a cluster merging check is performed in order to determine whether a pair of clusters should be merged together. The cluster merging check includes, for each of multiple pairs of clusters, calculating a similarity measurement representative of a degree of similarity between the two clusters in a pair. The similarity measurement may use a cosine similarity metric, or a Euclidean distance metric, and is applied to the pair of cluster vectors associated with the pair of clusters.

If the similarity measurement meets a predetermined similarity criterion indicating that the two clusters are deemed to be similar, the method moves to S305, and the pair of clusters are merged. Conversely, if the similarity measurement does not meet the predetermined similarity criterion indicating that the two clusters are deemed to be similar, the pair of clusters are not merged and the method does not move to S305.

The predetermined similarity criterion is preferably a predetermined similarity threshold, and the clusters may be deemed to be similar when the similarity measurement exceeds the predetermined similarity threshold. The predetermined similarity threshold may be adjustable by user input. In the example where the similarity measurement uses a cosine similarity metric, the predetermined similarity threshold may be adjustable between 0 and 1, and may be set to approximately 0.7.

In order to reduce computing resource load, the cluster merging check at S304 may be performed less frequently than assigning new request vectors (or batches of request vectors) to the plurality of clusters. This is because the cluster merging check may occupy more computing resources than assigning a batch of new requests vectors to the clusters. This is characterised by a cluster merging rate parameter, which reflects the number of merging checks performed for each batch of new request vectors assigned to the clusters. Preferably, the cluster merging rate parameter is 0.1, so that a cluster merging check is performed for every 10 request vectors (or batches or request vectors) assigned to the clusters.

In order to further reduce computing resource load, each cluster is only merged no more than once per cluster merging check.

In S305, merging a pair of clusters comprises summing the cluster vectors associated with the clusters to define a new cluster vector of the merged cluster, and summing the two cluster weights to define a new cluster weight of the merged cluster. The original pair of clusters are then disregarded. The new merged cluster is assigned a cluster creation timestamp equal to the earlier cluster creation timestamp associated with the clusters in the merged pair, and is assigned the cluster identification tag associated with the cluster in the pair having the earlier cluster creation timestamp.

In S306, one or more clusters are culled (e.g. disregarded) if they are deemed insignificant.

In some examples, clusters may be deemed insignificant if the cluster represents old or out of date request vectors. Specifically, clusters may be deemed insignificant based on one or more of the cluster weight, the cluster size tag, and the cluster creation time. For example, clusters may be deemed insignificant based on the difference between the cluster weight (which decays over time) and the cluster size tag (which does not decay over time). A large difference between the cluster weight associated with a cluster and the cluster size tag associated with the cluster may indicate that the cluster represents old or out of date clusters. Thus, a cluster may be deemed insignificant if (i) the cluster size tag indicating a total number of request vectors assigned to the cluster is (much) greater than 1; and (ii) the cluster weight associated with the cluster is less than a predetermined threshold, which may be adjustable via user input between 0 and 1, and may be set to 0.5, for example.

Alternatively/additionally, one or more clusters deemed insignificant may be culled if the total number of clusters exceeds a predetermined value (e.g. 1000), in order to prevent the number of clusters exceeding the predetermined value. In this case, the one or more clusters deemed insignificant may be the one or more clusters with the lowest cluster weight, and optionally the lowest cluster weight among the clusters which have existed for more than a predetermined amount of time.

At S308, if the values of any indices of the cluster vectors are deemed insignificant, those values are discarded. Specifically, any index of a cluster vector holding a value that is less than a predetermined threshold (which may be between 0 and 1, and may be controllable) is identified, and its value is reduced to 0, or removed so that the index is "empty".

In this way, the clusters are updated in order to ensure a real-time, up-to-date representation of the distribution of web requests. Dynamically updating the clusters as set out in FIG. 3 also improves the computational efficiency of monitoring the clusters in order to identify any anomalous clusters.

An example implementation of the clustering algorithm may be:

1. If there are any existing clusters, check if merging is possible. Cluster merging can be controlled by a cluster merging rate parameter, which can range from 0 (e.g. never) to 1 (at every batch). Typically, the cluster merging rate parameter is set to approximately 0.1 (e.g. 1 in 10 batches). The cluster merging check is performed by the following steps:
    a. Calculate cluster-to-cluster similarity, using a cosine similarity metric for categorical features (although a different similarity or distance measurement such as a Euclidean distance measurement may be used).
    b. Identify pairs of clusters where the cluster-to-cluster similarity is greater than a predetermined similarity threshold. This threshold determines how dynamic the clustering behaves and can be set, for cases using the cosine similarity metric, to between 0 and 1. A typical value is 0.7.
    c. From the most to least similar pairs of clusters, each is only part of one merge per iteration:
        i. Sum cluster vectors
        ii. Sum cluster weights
        iii. Assign a cluster creation timestamp equal to the earlier cluster creation timestamp of the pair of clusters
        iv. Remove original pair of clusters.
2. Check the total number of clusters does not exceed the predefined maximum number of clusters allowed. This is generally set to 1000, but could range from a couple (e.g. two) to infinite. The limit is set to ensure performance of the clustering algorithm.
3. Update cluster weights using time decay algorithm. The cluster weights decay by $2^{(-decay\ rate \times seconds\ since\ last\ update)}$.
    The decay $$\text{rate} = \frac{1}{\text{cluster half} - \text{life in seconds}}.$$

The cluster half-life is a controllable parameter which controls how quickly a cluster will decay. The cluster half-life may be in the range of 1 second to several hours. A typical value is 5-10 seconds.

4. Prune clusters. If any clusters which contain more than one request vector have a weight which is less than a predetermined threshold, remove those clusters. The predetermined threshold is set between 0 and 1. A typical value is 0.5.

5. Assign new request vector(s) to clusters. For each new request vector:
   a. Match request vector to closest cluster using the same similarity or distance measurement metric used in step 1.
   b. If the request vector is similar enough to the cluster (defined by similarity metric and a predetermined threshold), the request vector is added to the cluster by adding the request vector to the cluster vector, and adding 1 to the cluster weight.
   c. If no clusters are similar enough to the cluster, form a new cluster with a cluster weight of 1, where the cluster vector is the request vector.

6. Output the newly assigned request vector in association with a cluster identification tag indicating the cluster the request vector is assigned to.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by the use of the antecedent "about," it will be understood that the particular value forms another embodiment. The term "about" in relation to a numerical value is optional and means for example +/−10%.

What is claimed is:

1. A method of processing web requests directed to a website, the method including, at a system for processing web requests:
   (i) for each of a plurality of web requests directed to a website, determining a request vector corresponding to the web request by applying a hash function to each web request to convert multiple predetermined features of each request into a request vector of a predefined size using hash values output by the hash function as indices of the request vector, wherein each request vector represents the multiple predetermined features of the respective web request;
   (ii) clustering the request vectors by respectively assigning each request vector to one of a plurality of clusters using a clustering algorithm such that request vectors deemed to be similar to each other are assigned to a same cluster of the plurality clusters;
   (iii) repeatedly updating the clustering of request vectors using the clustering algorithm such that the plurality of clusters dynamically change over time;
   (iv) monitoring cluster metadata associated with each cluster as the plurality of clusters dynamically change over time, wherein the monitored cluster metadata associated with each cluster represents a current state of the cluster;
   (v) identifying, based on the monitoring, any cluster meeting a predetermined anomaly criterion indicating that the cluster is displaying anomalous behaviour; and
   (vi) triggering an investigation of a cluster identified as meeting the predetermined anomaly criterion,
   wherein cluster metadata associated with each cluster includes a cluster vector based on the request vectors represented by the respective cluster, and a cluster weight based on a number of request vectors represented by the respective cluster, and
   wherein updating the clustering of the request vectors includes:
      updating the cluster metadata to reflect a current state of the cluster by applying a time decay algorithm to each cluster vector, wherein the time decay algorithm causes a magnitude of the cluster vector to decay with time; and
      for each cluster vector: discarding a value of one or more indices of the cluster vector when the value is deemed insignificant.

2. The method of claim 1, wherein each request vector includes a plurality of feature vector portions, each feature vector portion representing a single predetermined feature of the web request, wherein each feature vector portion is a one-hot encoded vector.

3. The method of claim 1, wherein clustering the request vectors into one or more clusters by respectively assigning each request vector to one of the plurality of clusters using a clustering algorithm includes, for each request vector, assigning the request vector to a cluster by:

calculating a similarity measurement representative of the degree of similarity between the request vector and the cluster vector associated with one or more existing clusters;

if the similarity measurement representative of the degree of similarity between the request vector and the cluster vector associated with any existing cluster meets a predetermined similarity criterion, assigning the request vector to one such existing cluster;

if the similarity measurement representative of the degree of similarity between the request vector and the cluster vector associated with each existing cluster fails to meet the predetermined similarity criterion, assigning the request vector to a new cluster.

4. The method of claim 1, wherein updating the clustering of request vectors includes performing a cluster merging check, the cluster merging check including:

for each of multiple pairs of clusters, calculating a similarity measurement representative of a degree of similarity between the two clusters in the pair; and if the similarity measurement representative of the degree of similarity between a pair of clusters meets a predefined similarity criterion indicating that the two clusters in the pair are deemed to be similar, merging the pair of clusters.

5. The method of claim 1, wherein updating the clustering of request vectors includes, if the number of clusters exceeds a predetermined value, culling one or more clusters deemed insignificant.

6. The method of claim 1, wherein updating the clustering of request vectors includes updating the cluster metadata to reflect a current state of the cluster by applying a time decay algorithm to each cluster weight, wherein the time decay algorithm causes each cluster weight to decay with time.

7. The method of claim 1, wherein monitoring the cluster metadata includes aggregating some or all or the cluster metadata over tumbling windows.

8. The method of claim 1, wherein the predetermined anomaly criterion is set such that a cluster is identified as meeting the predetermined anomaly criterion based, at least in part, on the cluster weight.

9. The method of claim 1, wherein triggering the investigation of a cluster identified as meeting the predetermined anomaly criterion includes:

passing information describing the web requests corresponding to the request vectors assigned to the cluster to a cluster investigation algorithm, for investigation by the cluster investigation algorithm; and performing the investigation of the identified cluster, by the cluster investigation algorithm.

10. The method of claim 9, wherein the cluster investigation algorithm performing the investigation of the identified cluster is configured to use a trained fuzzy inference algorithm.

11. A computer system configured to:

(i) for each of a plurality of web requests directed to a website, determine a request vector corresponding to the web request by applying a hash function to each web request to convert multiple predetermined features of each web request into a request vector of a predefined size using hash values output by the hash function as indices of the request vector, wherein each request vector represents the multiple predetermined features of the respective web request;

(ii) cluster the request vectors by respectively assigning each request vector to one of a plurality of clusters using a clustering algorithm such that request vectors deemed to be similar to each other are assigned to a same cluster of the plurality of clusters;

(iii) repeatedly update the clustering of request vectors using the clustering algorithm such that the plurality of clusters dynamically change over time;

(iv) monitor cluster metadata associated with each cluster as the plurality of clusters dynamically change over time, wherein the monitored cluster metadata associated with each cluster represents a current state of the cluster;

(v) identify, based on the monitoring, any cluster meeting a predetermined anomaly criterion indicating that the cluster is displaying anomalous behaviour; and (vi) trigger an investigation of a cluster identified as meeting the predetermined anomaly criterion, wherein cluster metadata associated with each cluster includes a cluster vector based on the request vectors represented by the respective cluster, and a cluster weight based on a number of request vectors represented by the respective cluster, and wherein updating the clustering of the request vectors includes:

updating the cluster metadata to reflect a current state of the cluster by applying a time decay algorithm to each cluster vector, wherein the time decay algorithm causes a magnitude of the cluster vector to decay with time; and for each cluster vector: discarding a value of one or more indices of the cluster vector when the value is deemed insignificant.

12. A computer-readable medium having computer-executable instructions configured to cause a computer system to:

(i) for each of a plurality of web requests directed to a website, determine a request vector corresponding to the web request by applying a hash function to each web request to convert multiple predetermined features of each web request into a request vector of a predefined size using hash values output by the hash function as indices of the request vector, wherein each request vector represents the multiple predetermined features of the respective web request;

(ii) cluster the request vectors by respectively assigning each request vector to one of a plurality of clusters using a clustering algorithm such that request vectors deemed to be similar to each other are assigned to a same cluster of the plurality of clusters;

(iii) repeatedly update the clustering of request vectors using the clustering algorithm such that the plurality of clusters dynamically change over time;

(iv) monitor cluster metadata associated with each cluster as the plurality of clusters dynamically change over time, wherein the monitored cluster metadata associated with each cluster represents a current state of the cluster;

(v) identify, based on the monitoring, any cluster meeting a predetermined anomaly criterion indicating that the cluster is displaying anomalous behaviour; and (vi) trigger an investigation of a cluster identified as meeting the predetermined anomaly criterion, wherein cluster metadata associated with each cluster includes a cluster vector based on the request vectors represented by the respective cluster, and a cluster weight based on a number of request vectors represented by the respective cluster, and wherein updating the clustering of the request vectors includes:

updating the cluster metadata to reflect a current state of the cluster by applying a time decay algorithm to each cluster vector, wherein the time decay algorithm causes a magnitude of the cluster vector to decay with time; and
for each cluster vector: discarding a value of one or more indices of the cluster vector when the value is deemed insignificant.

\* \* \* \* \*